(12) United States Patent
Kutsuna et al.

(10) Patent No.: US 10,590,815 B2
(45) Date of Patent: Mar. 17, 2020

(54) LUBRICATING DEVICE FOR ENGINE

(71) Applicant: MAKITA CORPORATION, Anjo-shi, Aichi-ken (JP)

(72) Inventors: Tomoyuki Kutsuna, Anjo (JP); Hiroki Sugiyama, Anjo (JP)

(73) Assignee: MAKITA CORPORATION, Anjo (JP)

(*) Notice: Subject to any disclaimer, the term of this patent is extended or adjusted under 35 U.S.C. 154(b) by 464 days.

(21) Appl. No.: 15/218,505

(22) Filed: Jul. 25, 2016

(65) Prior Publication Data

US 2017/0101908 A1 Apr. 13, 2017

(30) Foreign Application Priority Data

Oct. 7, 2015 (JP) ................................. 2015-199160

(51) Int. Cl.
| | |
|---|---|
| *F01M 1/08* | (2006.01) |
| *F01M 1/04* | (2006.01) |
| *F16N 7/32* | (2006.01) |
| *F01M 9/10* | (2006.01) |
| *F01M 11/00* | (2006.01) |
| *F16N 7/34* | (2006.01) |
| *F01L 1/047* | (2006.01) |
| *F01L 1/02* | (2006.01) |

(52) U.S. Cl.
CPC ............... *F01M 1/08* (2013.01); *F01M 1/04* (2013.01); *F01M 9/106* (2013.01); *F01M 11/0004* (2013.01); *F16N 7/32* (2013.01); *F01L 1/02* (2013.01); *F01L 2001/054* (2013.01); *F01L 2810/02* (2013.01); *F16N 7/34* (2013.01)

(58) Field of Classification Search
CPC ..... F01L 1/02; F01L 2001/054; F01L 2810/02; F01M 11/0004; F01M 1/04; F01M 1/08; F01M 9/106; F16N 7/32; F16N 7/34
See application file for complete search history.

(56) References Cited

U.S. PATENT DOCUMENTS 5,975,042 A * 11/1999 Aizawa .................... F01M 1/04
123/196 CP
6,170,456 B1 * 1/2001 Gu ............................ F01M 9/06
123/196 S (Continued)

FOREIGN PATENT DOCUMENTS

| JP | 2004-293448 A | 10/2004 |
|---|---|---|
| JP | 2011-074833 A | 4/2011 |

OTHER PUBLICATIONS

Apr. 23, 2019 Office Action issued in Japanese Patent Application No. 2015-199160.

(Continued)

*Primary Examiner* — Stephen K Cronin
*Assistant Examiner* — Ruben Picon-Feliciano
(74) *Attorney, Agent, or Firm* — Oliff PLC (57) ABSTRACT

The first opening part penetrates the first partition wall that separates the crank chamber and the oil sump chamber. The lubricating device of the engine includes an oil mist generation control part. The oil mist generation control part disperses gas injected from the crank chamber into the oil sump chamber through the first opening part when the crank chamber has a positive pressure or restricts the flow of oil with which the injected gas collides, thereby controlling an amount of oil mist generated in the oil sump chamber.

8 Claims, 9 Drawing Sheets

(56) References Cited

U.S. PATENT DOCUMENTS

2009/0013959 A1* 1/2009 Lin .......................... F01M 1/04
                                                              123/196 M
2011/0073064 A1* 3/2011 Mavinahally ............. F01L 1/02
                                                              123/195 R

OTHER PUBLICATIONS

Apr. 23, 2019 Office Action issued in Japanese Patent Application No. 2015-199160 with additional translation.

* cited by examiner

LUBRICATING DEVICE FOR ENGINE

CROSS-REFERENCE TO RELATED APPLICATION

The application claims priority to Japanese Patent Application No. 2015-199160 filed on Oct. 7, 2015, the entire contents of which are incorporated herein by reference.

BACKGROUND OF THE INVENTION

1. Field of the Invention

The present invention relates to a lubricating device for an engine (internal combustion engine) that can be installed in a portable work machine or the like.

2. Description of Related Art

An engine installed in a portable work machine, such as a brush/weed cutter, may include a crank chamber, in which the pressure varies as a piston moves up and down, and an oil sump chamber which is disposed beneath the crank chamber and that retains lubricating oil. Such an engine is disclosed in JP 2004-293448 A. According to the engine disclosed in JP 2004-293448 A, a crank chamber and an oil sump chamber are in communication through an opening part, and the oil mist generated in the oil sump chamber is supplied to the crank chamber through the opening part.

Note that various types of engines are installed in portable work machines. The standard rotational speed (operating condition) or the shape of the oil sump chamber varies according to the engine type. Accordingly, it is required to optimize the amount of oil mist generated in the oil sump chamber according to the engine type.

SUMMARY OF THE INVENTION

In view of the above circumstances, the present invention has been accomplished and an object of the present invention is to optimize the amount of oil mist generated in the oil sump chamber.

According to an aspect of the present invention, a lubricating device for an engine is provided. The lubricating device for an engine includes: a crank chamber a pressure in which varies as a piston moves up and down; an oil sump chamber which is disposed below the crank chamber to retain lubricating oil; a first partition wall which separates the crank chamber and the oil sump chamber; a first opening part which penetrates the first partition wall and provides communication between the crank chamber and the oil sump chamber; and an oil mist generation control part which disperses gas injected from the crank chamber into the oil sump chamber through the first opening part when the crank chamber has a positive pressure, or restricts the flow of oil with which the injected gas collides, thereby controlling an amount of oil mist generated in the oil sump chamber.

Other objects and features of aspects of the present invention will be understood from the following description with reference to the accompanying drawings.

DESCRIPTION OF THE PREFERRED EMBODIMENTS

Hereinafter, embodiments of the present invention will be described in detail with reference to the accompanying drawings.

Figure 1:
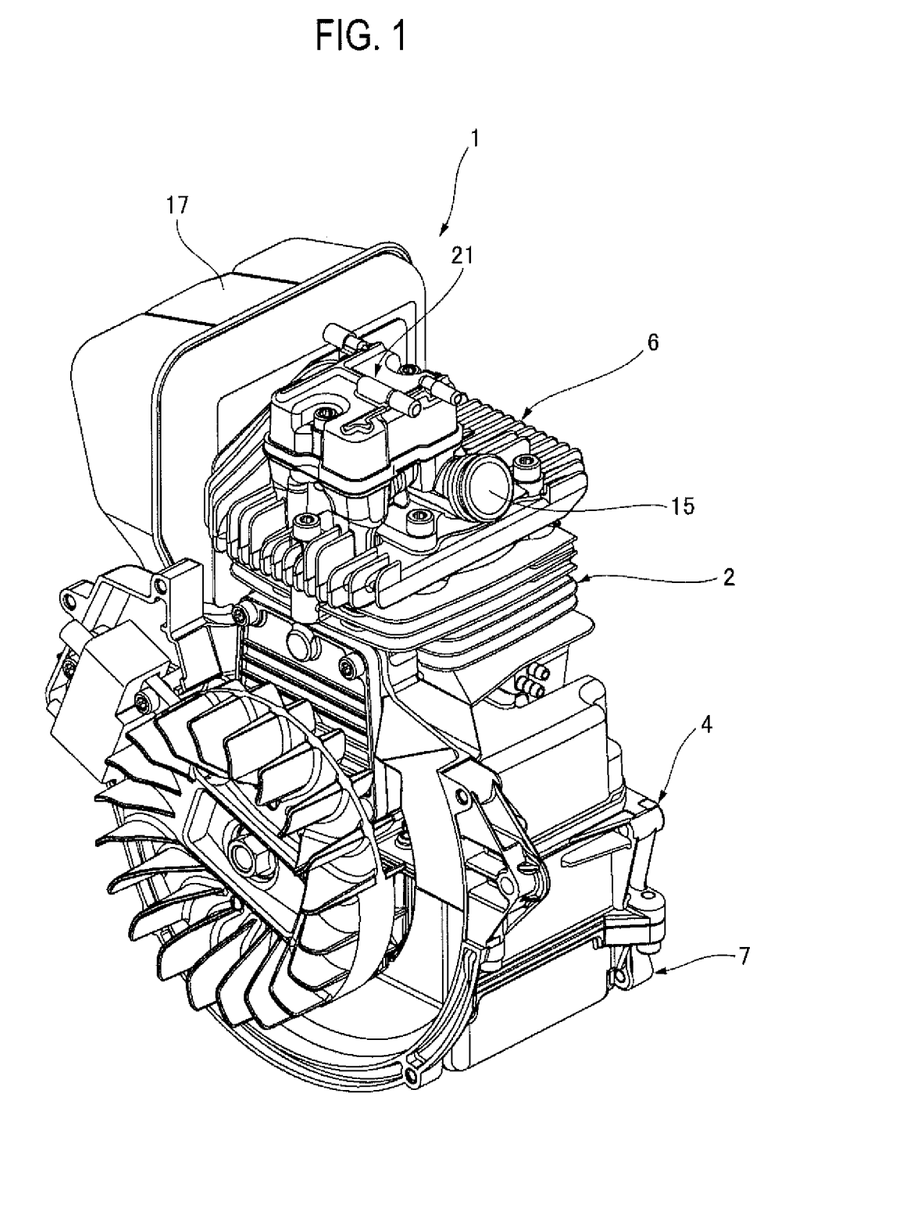
FIG. 1 is a perspective view of an engine according to a first embodiment of the present invention.
Figure 2:
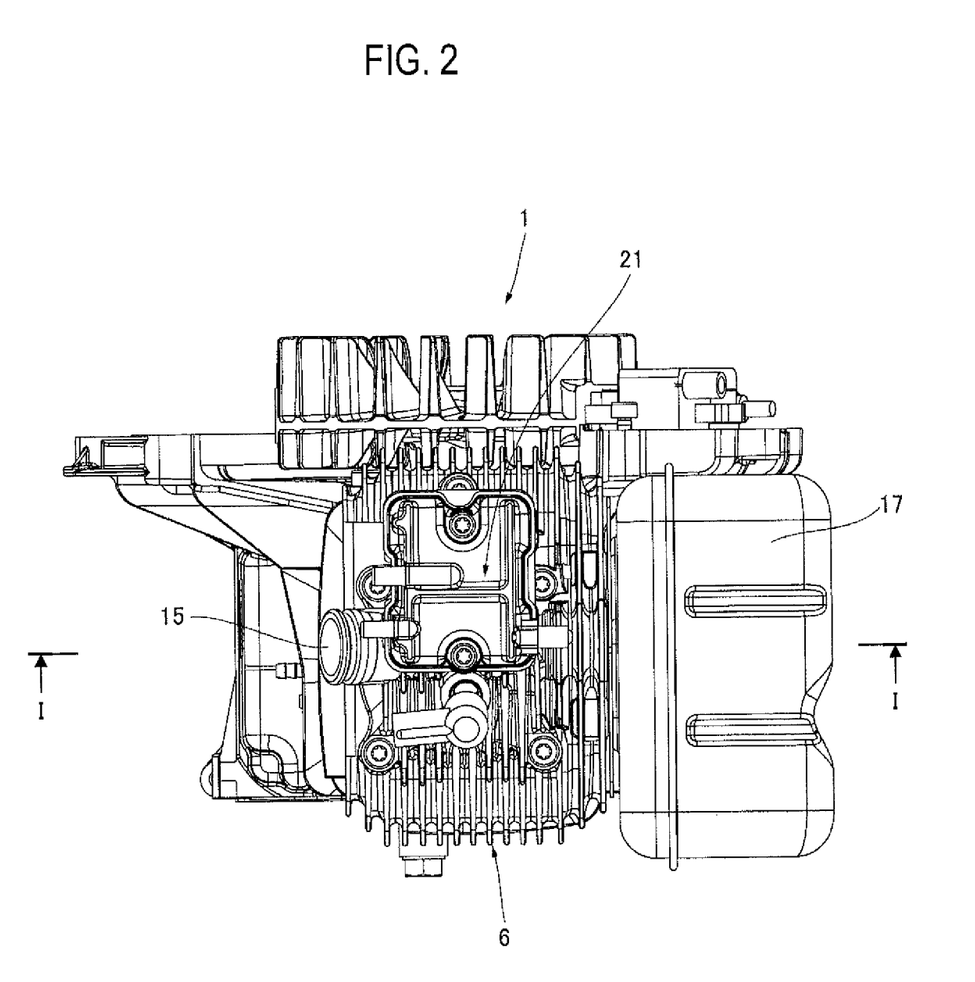
FIG. 2 is a plan view of the engine according to the first embodiment.
Figure 3:
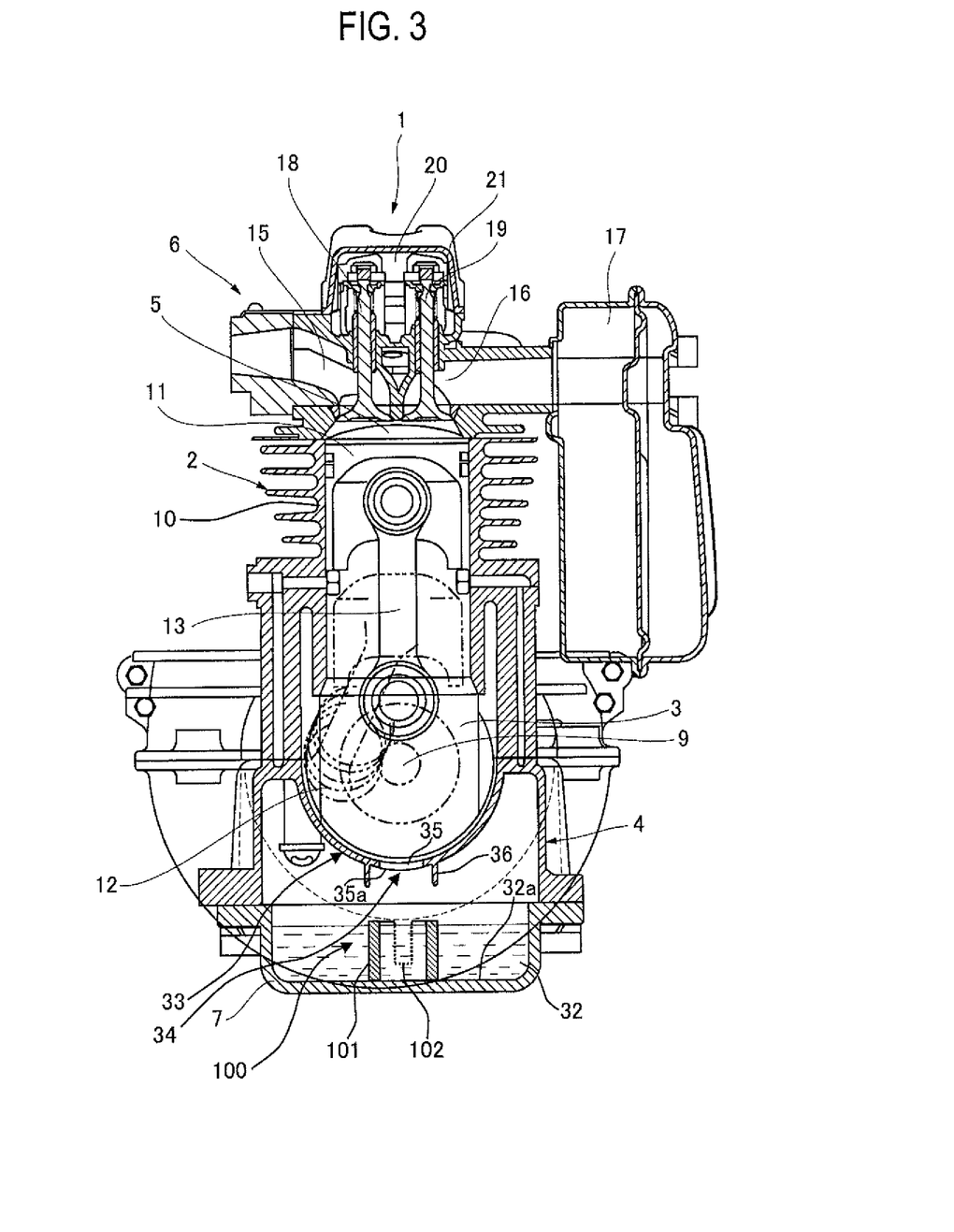
FIG. 3 is a cross-sectional view taken at line I-I in FIG. 2.

FIG. 1 and FIG. 2 are a perspective view and a plan view, respectively, of an engine according to a first embodiment of the present invention. FIG. 3 is a cross-sectional view taken at line I-I in FIG. 2. FIG. 3 illustrates the engine when a piston is positioned near a top dead center. Furthermore, as used in the present embodiment, "upper side" approximately coincides with a vertical upper side in a state in which the engine is used over a longest period of time (upright state).

An engine 1 is an overhead valve (OHV) 4-stroke, air-cooled engine. The engine 1 has a cylinder block 2, a crank case 4, and a cylinder head 6. The crank case 4 is disposed on one end (the lower end) in the longitudinal direction of the cylinder block 2 and constitutes a crank chamber 3. The cylinder head 6 is disposed on the other end (the upper end) in the longitudinal direction of the cylinder block 2 and constitutes, together with the cylinder block 2, a combustion chamber 5.

In the present embodiment, the cylinder block 2, the crank case 4, and the cylinder head 6, which are all provided separately, are connected by bolts. An oil case 7 for retaining lubricating oil is connected to the lower end of the crank case 4.

The crank case 4 is provided at the lower end of the cylinder block 2. The cylinder block 2 and the crank case 4 rotatably support a crank shaft 9. More specifically, the crank shaft 9 is disposed so that the opposite ends thereof project out of the crank chamber 3 formed inside the crank case 4. In the present embodiment, both ends of the crank shaft 9 projecting out of the crank chamber 3 are held between the cylinder block 2 and the crank case 4, and are rotatably supported thereby. Furthermore, in the present embodiment, one end of the crank shaft 9 (namely, the end adjacent to a valve drive chamber 30, which will be described below) is rotatably supported by the cylinder block 2 and the crank case 4 via a bearing 40, which will be described below. This will be described below in more detail with reference to FIG. 5.

A cylinder 10 having a columnar space is provided in the cylinder block 2. A piston 11 is inserted in the cylinder 10 such that the piston 11 can reciprocate in the vertical direction. The piston 11 is connected to the crank shaft 9 of the crank chamber 3 via a crank web 12 and a connecting rod 13. Thus, the reciprocating motion of the piston 11 is converted into the rotational motion of the crank shaft 9.

Furthermore, the reciprocation of the piston 11 also changes the pressure (air pressure) in the crank chamber 3.

The cylinder head 6 is provided with an intake port 15 and an exhaust port 16. The intake port 15 is in communication with a carburetor (not illustrated). The exhaust port 16 is in communication with a muffler 17. Furthermore, the cylinder head 6 is provided with an intake valve 18, which opens and closes the intake port 15, and an exhaust valve 19, which opens and closes the exhaust port 16.

Furthermore, the cylinder head 6 includes a valve system chamber 20, which accommodates the intake valve 18 and the exhaust valve 19. The valve system chamber 20 is formed of the cylinder head 6 and a valve system chamber cover 21.

The intake valve 18 and the exhaust valve 19 are provided with a valve mechanism 25 (refer to FIG. 6) for driving the intake valve 18 and the exhaust valve 19. The valve mechanism 25 includes a valve drive gear 26, a cam gear 27, a cam 28, a pair of cam followers (not illustrated), a pair of pushrods (not illustrated), and valve springs (not illustrated). The valve drive gear 26 is fixed to the crank shaft 9. The cam gear 27 is driven by the valve drive gear 26. The cam 28 is provided on one end of the cam gear 27. The pair of cam followers is swung by the cam 28 and rotatably supported by the cylinder block 2. The pair of pushrods is supported by a rocker shaft (not illustrated) provided on the head of the cylinder block 2. One end of each push rod is in contact with the valve heads of the intake valve 18 and the exhaust valve 19. The valve springs urge the intake valve 18 and the exhaust valve 19 in a valve closing direction.

Among the sections constituting the valve mechanism 25, the valve drive gear 26, the cam gear 27, and the cam 28 are accommodated in the valve drive chamber 30. The valve drive chamber 30 is disposed on a side of the crank chamber 3. The valve drive chamber 30 is composed of the cylinder block 2, the crank case 4, and a valve drive chamber cover (not illustrated). Among the sections constituting the valve mechanism 25, the pushrods and the valve springs are accommodated in the valve system chamber 20. The valve system chamber 20 is disposed above the combustion chamber 5.

The valve mechanism 25 corresponds to "each valve mechanism for intake and exhaust" in the present invention. Furthermore, the valve drive gear 26, the cam gear 27, and the cam 28 correspond to "the drive components of each valve mechanism for intake and exhaust" in the present invention.

The oil case 7 is formed of a casing surrounding all sides and the bottom. By attaching the oil case 7 to the crank case 4, an oil sump chamber 32 is formed by the cases 4 and 7. Lubricating oil is retained in the oil sump chamber 32. A semi-tubular part of the crank case 4 rotatably accommodates the crank shaft 9, and the semi-tubular part provides a first partition wall 33, which separates the crank chamber 3 and the oil sump chamber 32.

As illustrated in FIG. 3, the crank chamber 3 and the oil sump chamber 32 are separated by the first partition wall 33. The first partition wall 33 has a semi-tubular shape. More specifically, the first partition wall 33 functions to rotatably accommodate the crank web 12, which is accommodated in the crank chamber 3, on the crank chamber 3 side, thus providing a curved surface part bulging toward the oil sump chamber 32. A central portion 34 of the curved surface part bulges most toward the oil sump chamber 32.

A first opening part 35 which provides communication between the crank chamber 3 and the oil sump chamber 32 is penetratingly formed in the central portion 34 of the semi-tubular first partition wall 33. The first opening part 35 is positioned within a projection plane of the piston 11 in the first partition wall 33. In other words, the first opening part 35 is penetratingly formed in an area hidden by the piston 11 when the first partition wall 33 is observed from the combustion chamber 5 side.

The first opening part 35 is preferably positioned right below the central portion of the piston 11. In other words, the central axis of the first opening part 35 and the central axis of the piston 11 are preferably positioned on the same axial line.

Although the shape of the cross-section of the first opening part 35 is circular in the present embodiment, the shape of the cross-section of the first opening part 35 is not limited thereto, and may be, for example, rectangular. Furthermore, the first opening part 35 in the present embodiment is composed of the single through hole; however, the first opening part 35 may alternatively be composed of two or more through holes.

A tubular section 36 is provided, surrounding the first opening part 35, at the lower surface of the semi-tubular first partition wall 33. The tubular section 36 projects downward from the lower surface of the first partition wall 33. In the present embodiment, the tubular section 36 has a cylindrical shape. Alternatively, however, the shape of the tubular section 36 is not limited thereto, and may be, for example, a rectangular column shape.

The oil sump chamber 32 is provided with an oil mist generation control part 100 for controlling an amount of oil mist generated in the oil sump chamber 32. The oil mist generation control part 100 is composed of the tubular member 101.

Figure 4A:
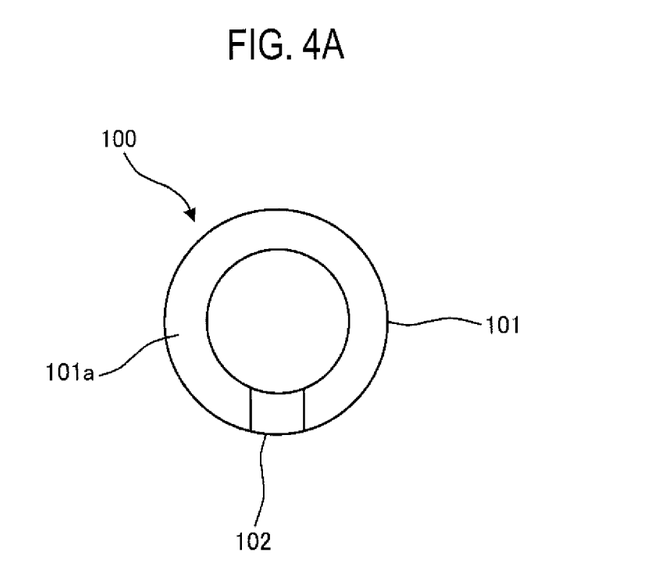
FIG. 4A is a top view of a tubular member disposed in an oil sump chamber of the engine according to the first embodiment.
Figure 4B:
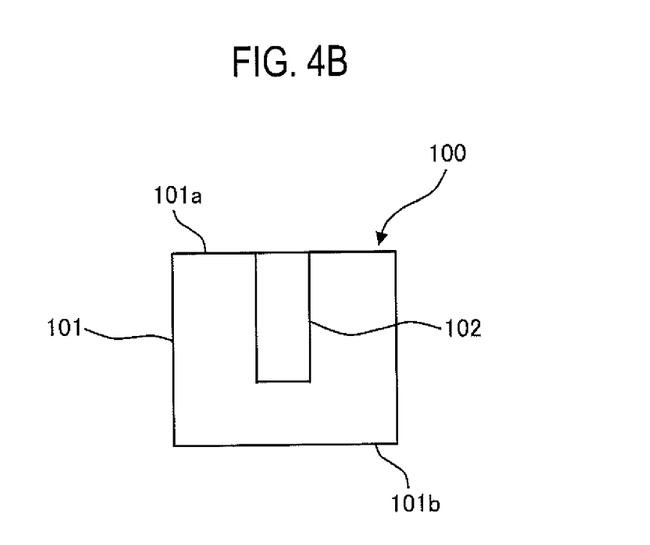
FIG. 4B is a side view thereof.

FIG. 4A is a top view of the tubular member 101, and FIG. 4B is a side view thereof. The tubular member 101 of the cylindrical shape is opened at an upper surface 101a. The tubular member extends vertically. In the present embodiment, the tubular member 101 has a cylindrical shape; however, the tubular member 101 is not limited to this shape and may have, for example, a rectangular column shape.

The tubular member 101 has a lower surface 101b fixed to a bottom surface 32a of the oil sump chamber 32 (namely, the bottom surface of the oil case 7). Thus, the oil mist generation control part 100 (tubular member 101) stands upright on the bottom surface 32a of the oil sump chamber 32. In the illustrated example, the bottom surface 32a of the oil sump chamber 32 is a part of the inner wall of the oil sump chamber 32. Furthermore, the tubular member 101 corresponds to the "convex portion" in the present invention. In the present embodiment, the oil mist generation control part 100 (tubular member 101) is attached to the oil case 7. Instead of this structure, the oil mist generation control part 100 (tubular member 101) can be formed integrally with the oil case 7 as a part of the oil case 7.

In the present embodiment, the upper end of the tubular member 101 is positioned above an oil surface in the oil sump chamber 32. However, the tubular member 101 may substantially entirely sink into the oil in the oil sump chamber 32 so that the upper surface can be flush with or below the oil surface.

A slot 102 is formed in the tubular member 101 from the upper end to the lower portion. In this example, the slot 102 corresponds to the "oil flow path" in the present invention. The slot 102 provides communication between the inside and the outside of the tubular member 101 and allows oil to pass through (in particular, in the horizontal direction). Accordingly, oil can flow into an area surrounded by the tubular member 101 through the slot 102. The slot 102 may be a slit extending from the upper end to the lower end of the tubular member 101.

The upper surface 101a of the tubular member 101 faces a lower surface 35a of the first opening part 35. In the present embodiment, the inner diameter of the tubular member 101 is larger than that of the first opening part 35. However, the inner diameter of the tubular member 101 can be equal to or smaller than that of the first opening part 35. In the present embodiment, the first opening part 35 is positioned within a projection plane of the tubular member 101 in the first partition wall 33. In other words, the first opening part 35 is penetratingly formed in an area hidden or surrounded by the tubular member 101 when the first partition wall 33 is observed from the bottom surface of the oil case 7.

As for the gas injected into the oil sump chamber 32 from the crank chamber 3 through the first opening part 35 at a positive pressure in the crank chamber 3, the gas can collide with a larger area of the oil surface at higher rotational speed of the engine 1. Taking the above into consideration, in the present embodiment, the dimensions such as the inner and outer diameters of the tubular member 101 are defined such that the gas injected through the first opening part 35 upon the low-speed rotation of the engine 1 collides with the tubular member 101 as little as possible and also, the gas injected through the first opening part 35 upon the high-speed rotation of the engine 1 collides with the tubular member 101 as much as possible.

The tubular member 101 is preferably positioned right below the first opening part 35 and the piston 11. In other words, the central axes of the tubular member 101, the first opening part 35, and the piston 11 are preferably positioned on the same axial line.

Figure 5:
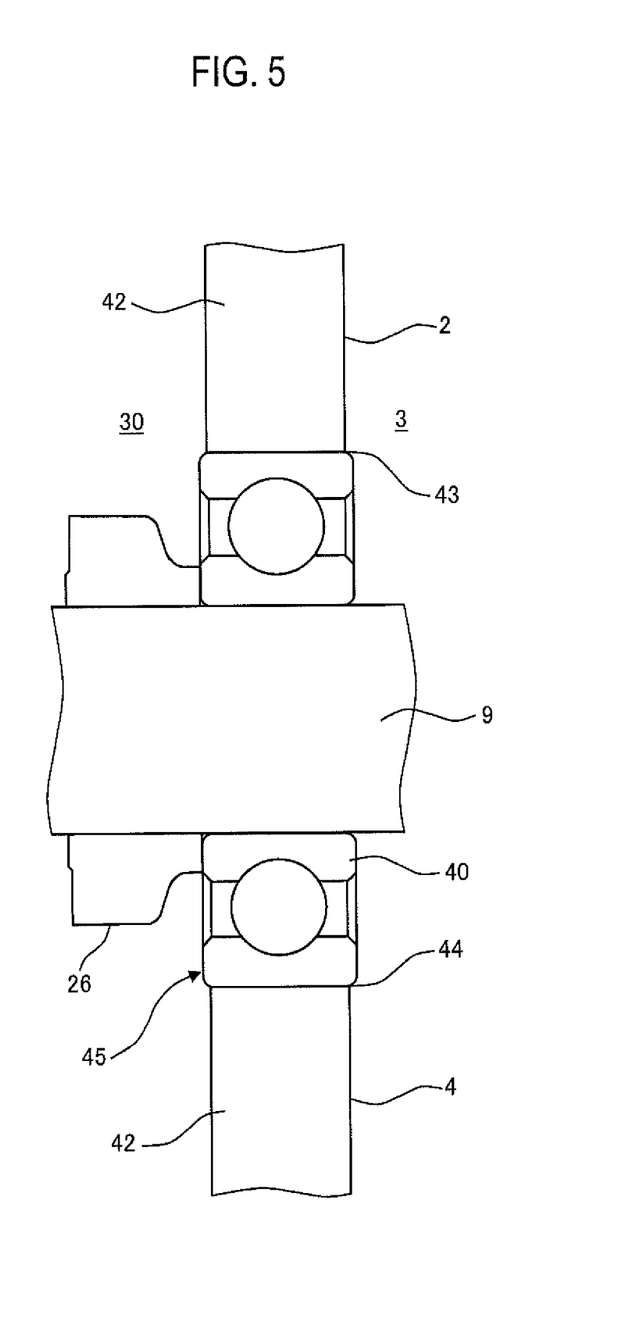
FIG. 5 is a view illustrating a bearing that rotatably supports a crank shaft of the engine according to the first embodiment.

FIG. 5 illustrates the bearing 40 that rotatably supports the crank shaft 9 of the engine 1 according to the present embodiment. The crank chamber 3 and the valve drive chamber 30 are separated by a second partition wall 42. The second partition wall 42 is composed of the cylinder block 2 and the crank case 4.

In the second partition wall 42, an upper opening part 43 having a semicircular cross-sectional shape is formed at the lower end of the cylinder block 2. In the second partition wall 42, a lower opening part 44 having a semicircular cross-sectional shape is formed at the upper end of the crank case 4.

A second opening part 45 is composed of the semicircular upper opening part 43 and the semicircular lower opening part 44 and has a circular cross-sectional shape. The second opening part 45 penetrates the second partition wall 42, providing communication between the crank chamber 3 and the valve drive chamber 30.

The bearing 40 is inserted in the second opening part 45 of the second partition wall 42. In other words, the bearing 40 is provided in the second opening part 45 of the second partition wall 42. The bearing 40 is an open ball bearing, which has a gap between the inner ring and the outer ring thereof and has gaps among plural balls thereof. Thus, the bearing 40 allows oil mist (mist-like oil) to pass through.

The bearing 40 has one end of the crank shaft 9 (the end on the valve drive chamber 30 side) inserted in the inner ring thereof to rotatably support the crank shaft 9. Hence, the one end of the crank shaft 9 (the end on the valve drive chamber 30 side) is rotatably supported by the cylinder block 2 and the crank case 4 via the bearing 40. A valve drive gear 26 is fixed to a portion of the one end of the crank shaft 9 that is positioned in the valve drive chamber 30. FIG. 5 does not illustrate the cam gear 27 driven by the valve drive gear 26.

Figure 6:
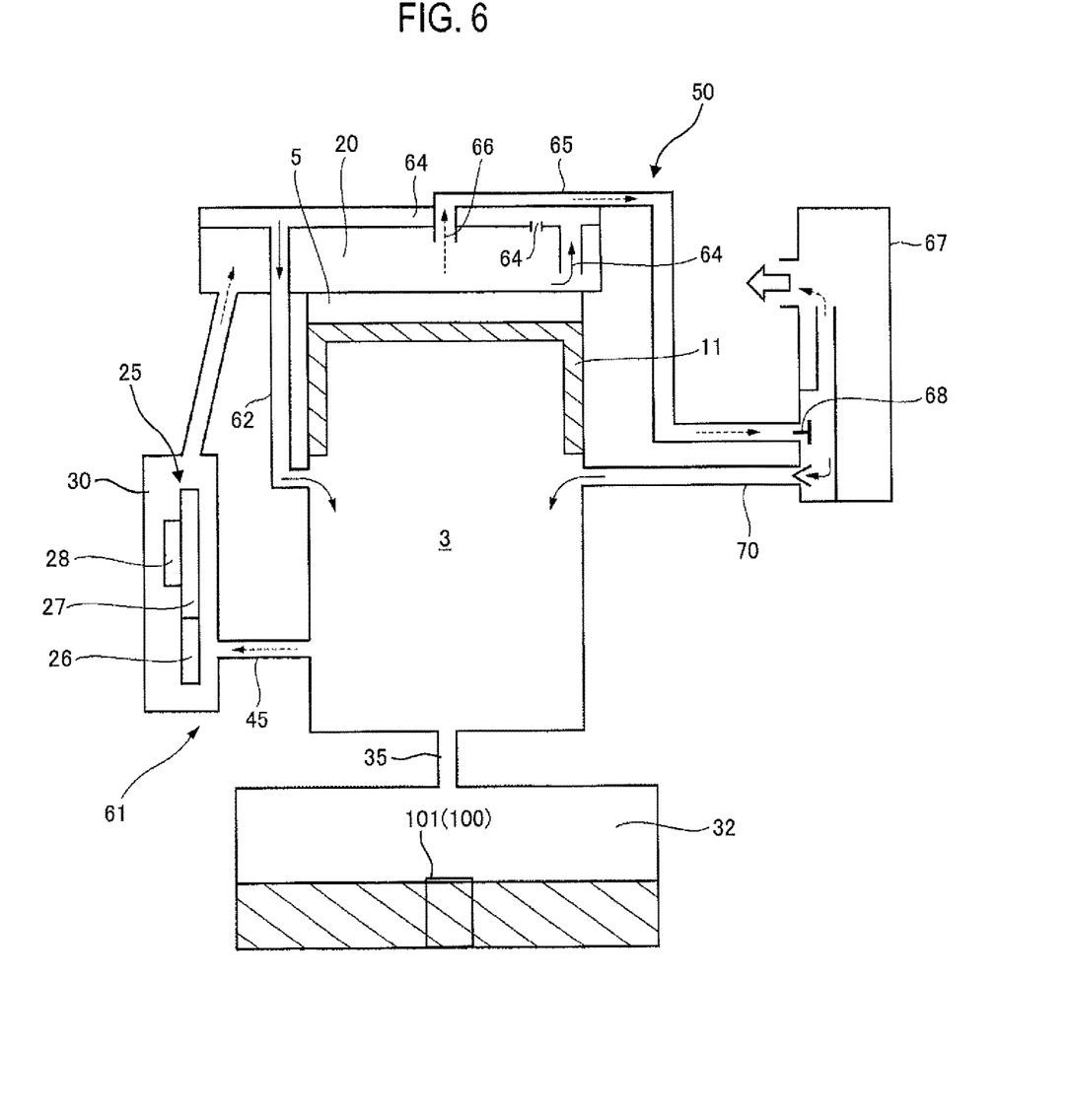
FIG. 6 is a schematic explanatory diagram of a lubricating device of the engine according to the first embodiment.

Referring now to FIG. 6, a description will be given of a lubricating device 50 of the engine 1 according to the present embodiment. FIG. 6 is a schematic explanatory diagram of the lubricating device 50 of the engine 1 according to the present embodiment. The lubricating device 50 of the engine 1 utilizes the changes in the pressure in the crank chamber 3 caused by the reciprocation of the piston 11 to circulate the oil retained in the oil sump chamber 32, thereby lubricating each section of the engine 1.

A circulation path 61 for circulating the oil is provided between the oil sump chamber 32 and the valve system chamber 20. The circulation path 61 includes the first opening part 35, the second opening part 45, the valve drive chamber 30, the valve system chamber 20, an oil feed passage 62, and the crank chamber 3.

If the piston 11 moves toward the top dead center, causing the pressure in the crank chamber 3 to become a negative pressure, then the oil mist in the oil sump chamber 32 passes through the first opening part 35 and is supplied to the crank chamber 3. Thereafter, if the piston 11 moves toward a bottom dead center, causing the pressure in the crank chamber 3 to become a positive pressure, then the oil mist in the crank chamber 3 passes through the second opening part 45 and is supplied to the valve drive chamber 30 and the valve system chamber 20.

The bearing 40 is provided in the second opening part 45 (refer to FIG. 5). With this arrangement, oil mist droplets having relatively large diameters among the oil mist droplets in the crank chamber 3 are blocked by the bearing 40, thus restricting their passage to the valve drive chamber 30 from the crank chamber 3. Meanwhile, among the oil mist droplets in the crank chamber 3, oil mist droplets having relatively small diameters pass through the gap between the inner ring and the outer ring of the bearing 40 and through the gaps among the plural balls of the bearing 40, and are supplied to the valve drive chamber 30. Thus, the valve drive gear 26, the cam gear 27, the cam 28, the pushrods, and the valve springs constituting the valve mechanism 25 are lubricated by the oil mist flowing through the circulation path 61.

A suction passage 64 through which the oil in the valve system chamber 20 is drawn in is provided inside the valve system chamber 20. The oil feed passage 62 is provided between the suction passage 64 and the crank chamber 3. The oil feed passage 62 has the open end on one side thereof connected to the suction passage 64 and the open end on the other side thereof connected to the crank chamber 3. The open end on the other side of the oil feed passage 62 is positioned such that the open end is fully opened when the piston 11 reaches the top dead center.

When the pressure in the crank chamber 3 becomes negative due to the movement of the piston 11 to the top dead center, the oil mist in the valve system chamber 20 is drawn in through the opening of the oil feed passage 62 and fed into the crank chamber 3 through the suction passage 64 and the oil feed passage 62. The oil fed into the crank chamber 3 is returned into the oil sump chamber 32 through the first opening part 35.

A discharge passage 65 for discharging the blow-by gas in the oil circulation path to the combustion chamber 5 is provided inside the valve system chamber 20. One end 66 of the discharge passage 65 is provided in the valve system chamber 20, while the other end thereof is connected to an air cleaner 67. The air cleaner 67 is provided on the upstream side of the above-mentioned carburetor and functions to remove dust and the like in the air.

The blow-by gas containing oil, which has been sent to the air cleaner 67, is subjected to the gas-liquid separation to be separated to the blow-by gas and oil by an oil separator 68 provided in the air cleaner 67. The separated oil passes through a reflux passage 70, which provides communication between the air cleaner 67 and the crank chamber 3, to be sent to the crank chamber 3. The open end of the reflux passage 70 on the crank chamber 3 side is positioned such that the open end is fully opened when the piston 11 reaches the top dead center. Hence, when the pressure in the crank chamber 3 becomes negative due to the movement of the piston 11 to the top dead center, the oil separated by the oil separator 68 is drawn through the reflux passage 70 and fed into the crank chamber 3. Meanwhile, the blow-by gas separated by the oil separator 68 is burnt in the combustion chamber 5 and then discharged to the outside through the muffler 17.

When the pressure in the crank chamber 3 becomes positive due to the movement of the piston 11 to the bottom dead center, a high-pressure gas in the crank chamber 3 is injected into the oil sump chamber 32 through the first opening part 35. In other words, the gas in the crank chamber 3 that is pushed out as the piston 11 moves to the bottom dead center is injected into the oil sump chamber 32 through the first opening part 35. The injected gas collides with the oil in the oil sump chamber 32, thus generating oil mist in the oil sump chamber 32.

A description is given of how the tubular member 101 controls the generation of oil mist. At the time of low-speed rotation of the engine 1, the injection amount and force of gas injected through the first opening part 35 into the oil sump chamber 32 may be at a low level. Supposing that the tubular member 101 is omitted, when the gas collides with the oil surface, the most of collision energy is consumed by oil to flow, whereby the oil cannot be fully atomized in some cases. In this regard, in the present embodiment, the tubular member 101 itself functions as an obstacle that blocks the flow of the oil present therein (namely, the area surrounded by the tubular member 101). As a result, even if the injection amount and force of the gas injected through the first opening part 35 are low, the gas can collide with the oil surface within the area surrounded by the tubular member 101, making it possible to save the collision energy from being consumed by the oil to flow and hereby promote the atomization of the oil. In other words, even when the engine 1 operates at the low rotational speed, the tubular member 101 suppresses the reduction in an amount of oil mist generated in the oil sump chamber 32, thereby optimizing the generation. Note that in the present embodiment, the dimensions such as the inner and outer diameters of the tubular member 101 are defined so that the gas injected through the first opening part 35 upon the low-speed rotation of the engine 1 collides with the tubular member 101 as little as possible. Thus, the injection force of the gas is less decreased after colliding with the tubular member 101. Accordingly, at the time of low-speed rotation of the engine 1, the tubular member 101 mainly restricts the flow of the oil with which the gas collides after being injected into the oil sump chamber 32 from the crank chamber 3 through the first opening part 35, thereby controlling the generation to increase an amount of oil mist generated in the oil sump chamber 32.

On the other hand, at the time of high-speed rotation of the engine 1, the gas might be injected through the first opening part 35 into the oil sump chamber 32 in a large amount at an excessive injection force. Hence, if the tubular member 101 is omitted, there is a possibility that the gas efficiently collides with the oil surface and the oil is excessively atomized, with the result that the oil is excessively consumed. In this regard, according to the present embodiment, the dimensions such as the inner and outer diameters of the tubular member 101 are defined so that the gas injected through the first opening part 35 upon the high-speed rotation of the engine 1 can collide with the tubular member 101 as much as possible. Thus, the gas can easily collide with the tubular member 101 and then disperse, whereby the injection force of the gas can be suppressed. On this account, compared to the structure not having the tubular member 101, the oil is less atomized and accordingly is not excessively consumed. In other words, even when the engine 1 operates at the high rotational speed, the tubular member 101 serves to suppress excessive generation of oil mist in the oil sump chamber 32, thereby optimizing the generation of the oil mist. Thus, at the time of high-speed rotation of the engine 1, the tubular member 101 mainly prompts the gas injected into the oil sump chamber 32 from the crank chamber 3 through the first opening part 35 to collide with the tubular member and hereby disperse. In this way, the tubular member 101 makes control to decrease the generation of the oil mist in the oil sump chamber 32.

According to the present embodiment, the lubricating device 50 of the engine 1 includes: the crank chamber 3, in which the pressure varies as the piston 11 moves up and down; the oil sump chamber 32 which is disposed below the crank chamber 3 to retain lubricating oil; the first partition wall 33 that separates the crank chamber 3 and the oil sump chamber 32; the first opening part 35 that penetrates the first partition wall 33 and provides communication between the crank chamber 3 and the oil sump chamber 32; and an oil mist generation control part 100 (tubular member 101) which disperses the gas that is injected into the oil sump chamber 32 through the first opening part 35 from the crank chamber 3 when the crank chamber 3 has a positive pressure, or which restricts the flow of the oil with which the injected gas collides, thereby controlling the generation of the oil mist in the oil sump chamber 32. Owing to the above oil mist generation control part 100, the generation of the oil mist in the oil sump chamber 32 can be optimized.

Furthermore, according to the present embodiment, the oil mist generation control part 100 (tubular member 101) is provided on the inner wall of the oil sump chamber 32. The oil mist generation control part 100 is a convex portion (tubular member 101) that stands upright on the bottom surface 32a of the oil sump chamber 32. Accordingly, the oil mist generation control part 100 can be provided in a simple manner.

According to the present embodiment, the convex portion is defined by the tubular member 101 that is opened at the upper surface 101a. The upper surface 101a of the tubular member 101 faces the lower surface 35a of the first opening part 35. With this arrangement, the generation of the oil mist can be controlled by prompting at least a part of the gas injected through the first opening part 35 to collide with the oil in the tubular member 101 within the oil sump chamber 32 (oil in the area surrounded by the tubular member 101).

According to the present embodiment, the tubular member 101 is provided with the oil flow path (slot 102) which provides communication between the inside and the outside of the tubular member 101 and allows the oil to pass through. Hence, the oil can be stably supplied into the tubular member 101 within the oil sump chamber 32 (the area surrounded by the tubular member 101) through the oil flow path (slot 102).

According to the present embodiment, the upper end of the convex portion (tubular member 101) is positioned above the oil surface within the oil sump chamber 32. With this arrangement, at least a part of the gas injected through the first opening part 35 can collide with the convex portion (tubular member 101), whereby the injection force of the gas can be suppressed. In this way, the generation of the oil mist can be controlled.

According to the present embodiment, the first opening part 35 is positioned within a projection plane of the convex portion (tubular member 101) in the first partition wall 33. Hence, the gas injected through the first opening part 35 can stably collide with the oil in the tubular member 101 within the oil sump chamber 32 (oil in the area surrounded by the tubular member 101).

According to the present embodiment, the lubricating device 50 of the engine 1 further includes: the valve drive chamber 30 which is disposed on the side of the crank chamber 3 and which accommodates the drive components of each valve mechanism for intake and exhaust; the second partition wall 42 that separates the crank chamber 3 and the valve drive chamber 30; and the second opening part 45 that penetrates the second partition wall 42 and provides communication between the crank chamber 3 and the valve drive chamber 30. In the lubricating device 50 of the engine 1, when the crank chamber 3 has a negative pressure, the oil mist in the oil sump chamber 32 is supplied to the crank chamber 3 through the first opening part 35. Moreover, in the lubricating device 50 of the engine 1, when the crank chamber 3 has a positive pressure, the oil mist in the crank chamber 3 is supplied to the valve drive chamber 30 through the second opening part 45. This makes it possible to supply the oil mist generated in the oil sump chamber 32 into the crank chamber 3 and the valve drive chamber 30 in a simple manner.

According to the present embodiment, the first partition wall 33 includes the tubular section 36 that surrounds the first opening part 35 and projects downward from the lower surface of the first partition wall 33. The tubular section 36 lowers the possibility that an excessive amount of oil in the oil sump chamber 32 flows into the crank chamber 3 through the first opening part 35, for example, when the engine 1 is inverted in use.

According to the present embodiment, the second opening part 45 accommodates the bearing 40 that rotatably supports the crank shaft 9. The bearing 40 is an open ball bearing that allows the oil mist to pass through. With this arrangement, among the oil mist droplets in the crank chamber 3, oil mist droplets having relatively small diameters pass through the gap between the inner ring and the outer ring of the bearing 40 and through the gaps among the plural balls of the bearing 40, and are supplied to the valve drive chamber 30. This makes it possible to suppress excessive supply of the oil to the valve drive chamber 30 and the valve system chamber 20.

Note that in the present embodiment, the dimensions, the opening area, the shape, etc. of the first opening part 35 might be set based on the volume (cylinder capacity) by which the piston 11 moves up and down inside the cylinder 10 of the engine 1.

Figure 7A:
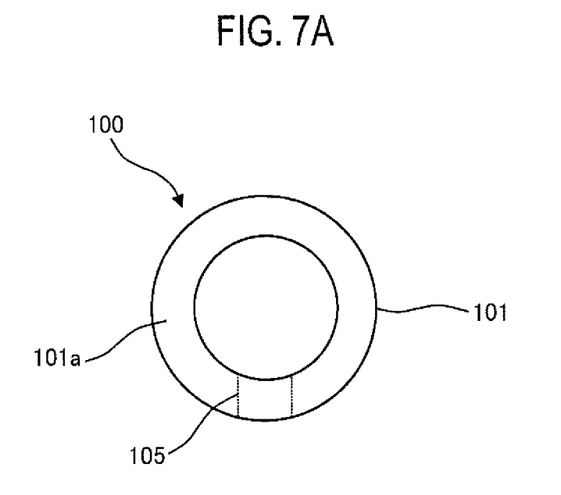
FIG. 7A is a top view of a modified example of the tubular member according to the first embodiment.
Figure 7B:
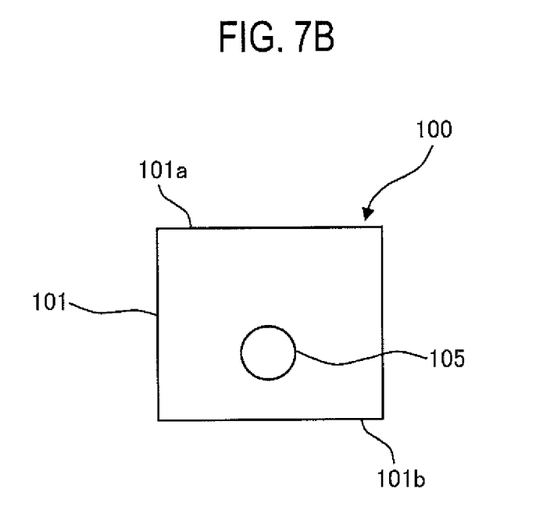
FIG. 7B is a side view thereof.

In the description of the present embodiment, the slot 102 is employed as an example of the oil flow path formed in the tubular member 101. However, the oil flow path is not limited to this structure. For example, as shown in FIGS. 7A and 7B, the communication hole (hole portion) 105 can be formed as the oil flow path in the tubular member 101 to allow the oil to flow in from the outside to the inside of the tubular member 101. FIGS. 7A and 7B are a top view and a side view of a modified example of the tubular member 101 according to the present embodiment.

Figure 8:
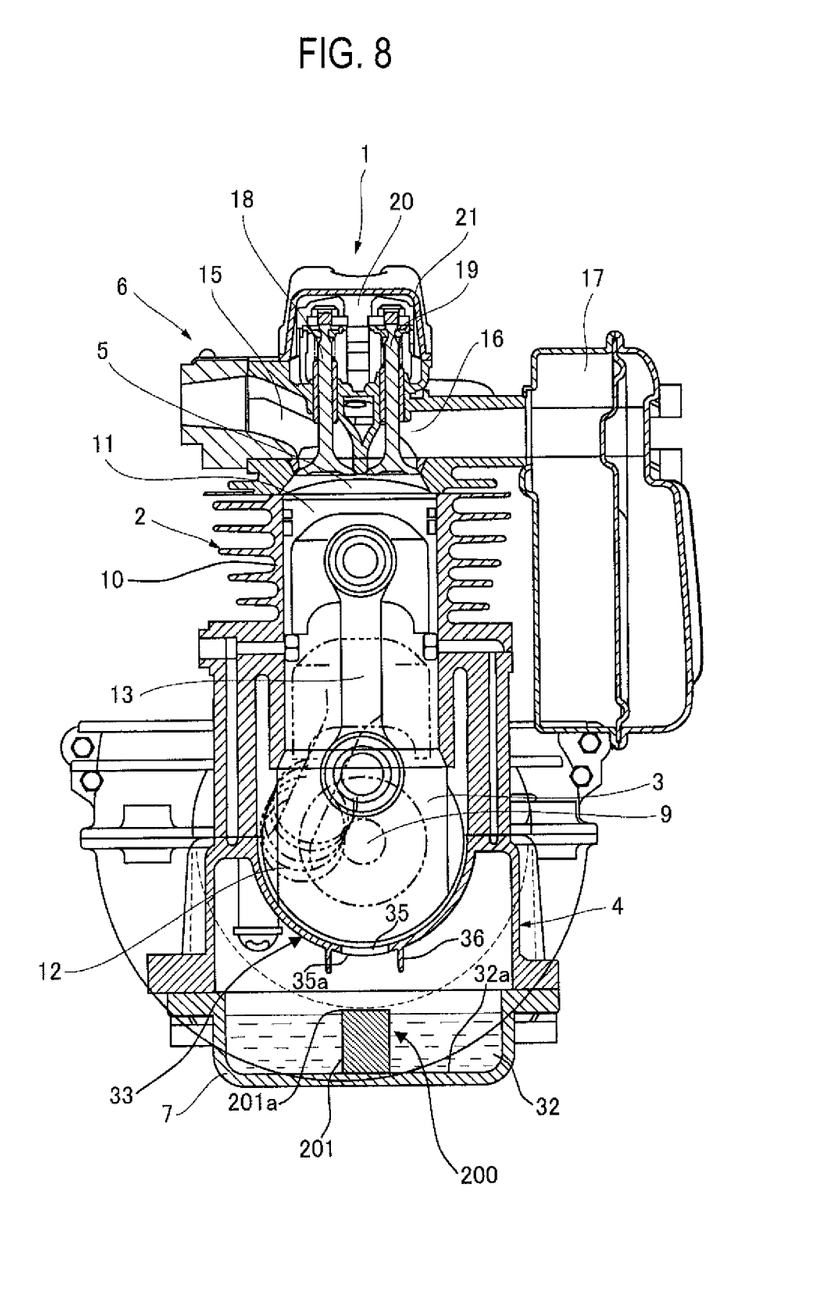
FIG. 8 is a cross-sectional view of an engine according to a second embodiment of the present invention.

Referring to FIG. 8, the lubricating device of the engine according to a second embodiment of the present invention will be described next. FIG. 8 is a cross-sectional view of the engine 1 according to the present embodiment, which is taken at line I-I in FIG. 2. The description is given of parts different from the first embodiment illustrated in FIGS. 1 to 7B.

The oil sump chamber 32 is provided with an oil mist generation control part 200 that controls the generation of the oil mist in the oil sump chamber 32. The oil mist generation control part 200 is constituted of a cylindrical, columnar member 201. The columnar member 201 has a cylindrical shape and extends vertically. Note that in the present embodiment, the columnar member 201 has a cylindrical shape but the shape of the columnar member 201 is not limited thereto and may be, for example, a rectangular column shape.

The columnar member 201 has the lower surface fixed to the bottom surface 32a of the oil sump chamber 32 (in other words, the bottom surface of the oil case 7). Therefore, the oil mist generation control part 200 (columnar member 201) stands upright on the bottom surface 32a of the oil sump chamber 32. In this example, the bottom surface 32a of the oil sump chamber 32 constitutes a part of the inner wall of the oil sump chamber 32. Moreover, the columnar member 201 corresponds to the "convex portion" of the present invention. Note that in the present embodiment, the oil mist generation control part 200 (columnar member 201) is mounted to the oil case 7. Instead of this structure, the oil mist generation control part 200 (columnar member 201) may be formed integrally with the oil case 7 as a part of the oil case 7.

In the present embodiment, the upper end of the columnar member 201 is positioned above the oil surface within the oil sump chamber 32. However, the columnar member 201 might be substantially entirely sunk in the oil in the oil sump chamber 32 so that the upper surface can be flush with or below the oil surface.

The upper surface 201a of the columnar member 201 faces the lower surface 35a of the first opening part 35. In the present embodiment, the outer diameter of the columnar member 201 is equal to the inner diameter of the first opening part 35. However, the outer diameter of the columnar member 201 may be either smaller or larger than the inner diameter of the first opening part 35. In addition, the first opening part 35 can be positioned within a projection plane of the columnar member 201 in the first partition wall 33. In other words, the first opening part 35 may be penetratingly formed in an area hidden by the columnar member 201 when the first partition wall 33 is observed from the bottom surface of the oil case 7.

It is preferred that the columnar member 201 is positioned just below the first opening part 35 and the piston 11. More specifically, the preferred arrangement is such that the central axis of the columnar member 201, the central axis of the first opening part 35, and the central axis of the piston 11 extend on the same axial line.

In the present embodiment, if the pressure in the crank chamber 3 becomes positive along with the movement of the piston 11 to the bottom dead center, the high-pressure gas in the crank chamber 3 is injected through the first opening part 35 into the oil sump chamber 32. In other words, the gas in the crank chamber 3, which is injected along with the movement of the piston 11 to the bottom dead center, is pushed out of the first opening part 35 into the oil sump chamber 32. At least a part of the injected gas collides with the upper surface 201a of the columnar member 201 in the oil sump chamber 32 and then disperses, whereby the injection force of the gas is suppressed. Under such control, the generation of the oil mist is decreased. To be specific, in the present embodiment, the columnar member 201 disperses the gas injected into the oil sump chamber 32, thereby controlling the generation of the oil mist in the oil sump chamber 32.

For example, when the engine 1 operates at the high rotational speed, the gas might be injected through the first opening part 35 into the oil sump chamber 32 in a large amount at an excessive injection force. Thus, if the columnar member 201 is omitted, there is a possibility that the gas efficiently collides with the oil surface and is excessively atomized, with the result that the oil is excessively consumed. In this regard, according to the present embodiment, the columnar member 201 is provided, whereby a part of the gas can collide with the upper surface 201a of the columnar member 201 and then disperse, making it possible to suppress the injection force of the gas. Compared to the structure not having the columnar member 201, the oil is less atomized and thus is not excessively consumed. That is, it is possible to suppress, by means of the columnar member 201, the excessive generation of the oil mist in the oil sump chamber 32, for example, upon the high-speed rotation of the engine 1, thereby optimizing the generation of the oil mist.

In particular, according to the present embodiment, the lubricating device 50 of the engine 1 includes: the crank chamber 3, in which the pressure varies as the piston 11 moves up and down; the oil sump chamber 32 which is disposed below the crank chamber 3 to retain lubricating oil; the first partition wall 33 that separates the crank chamber 3 and the oil sump chamber 32; the first opening part 35 that penetrates the first partition wall 33 and provides communication between the crank chamber 3 and the oil sump chamber 32; and the oil mist generation control part 200 (columnar member 201) that disperses the gas injected into the oil sump chamber 32 through the first opening part 35 from the crank chamber 3 when the crank chamber 3 has a positive pressure, thereby controlling the generation of the oil mist in the oil sump chamber 32. Owing to the above oil mist generation control part 200, the generation of the oil mist in the oil sump chamber 32 can be optimized.

Furthermore, according to the present embodiment, the oil mist generation control part 200 (columnar member 201) is provided on the inner wall of the oil sump chamber 32. The oil mist generation control part 200 is a convex portion (columnar member 201) that stands upright on the bottom surface 32a of the oil sump chamber 32. Accordingly, the oil mist generation control part 200 can be provided in a simple manner.

According to the present embodiment, the convex portion is constituted of the columnar member 201. The gas injected through the first opening part 35 collides with the upper surface 201a of the columnar member 201. Thus, the gas disperses at the upper surface 201a of the columnar member 201, making it possible to suppress, by means of the columnar member 201, the excessive generation of the oil mist in the oil sump chamber 32, for example, upon the high-speed rotation of the engine 1. In this way, the generation of the oil mist can be optimized.

Figure 9:
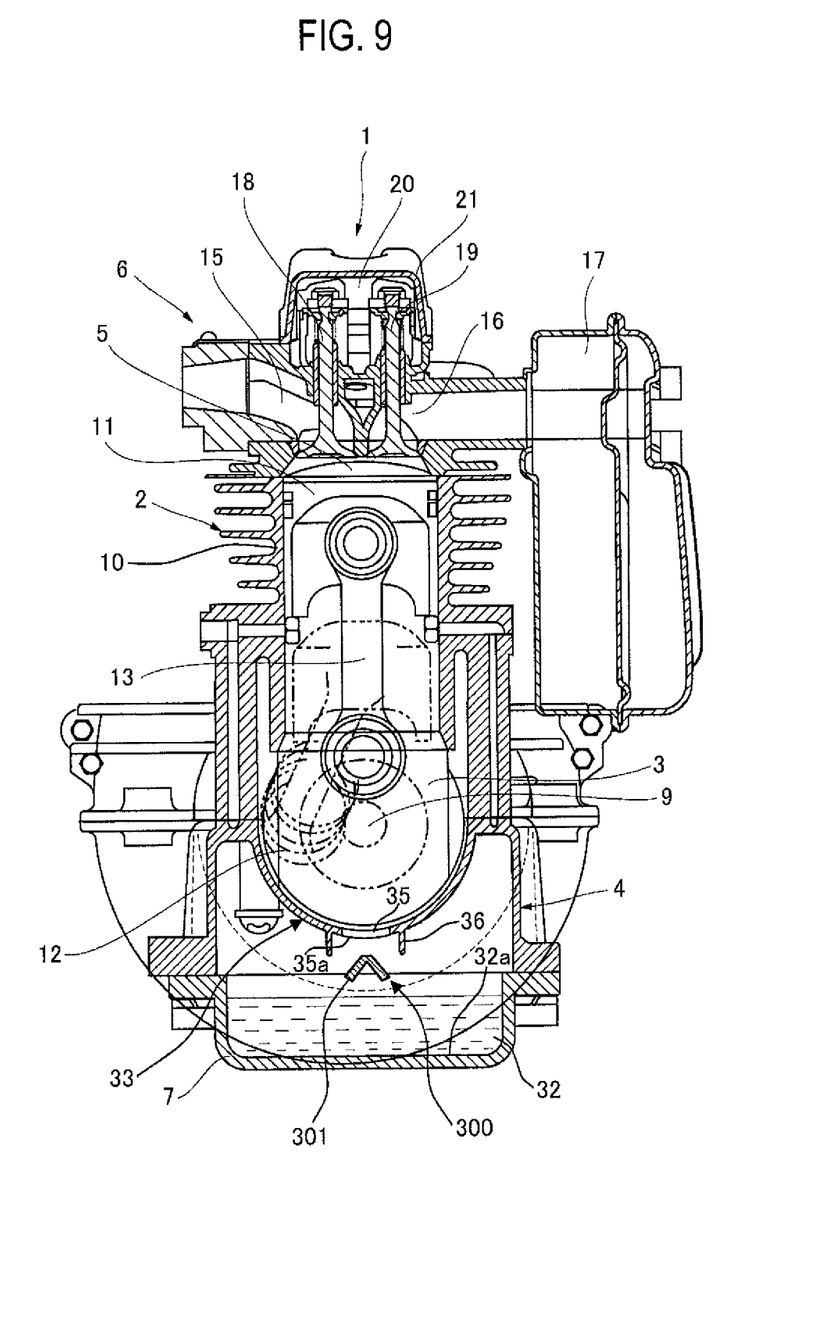
FIG. 9 is a cross-sectional view of an engine according to a third embodiment of the present invention.

Referring to FIG. 9, the lubricating device of the engine according to a third embodiment of the present invention will be described next. FIG. 9 is a cross-sectional view of the engine 1 according to the present embodiment, which is taken at line I-I in FIG. 2. The description is given of parts different from the second embodiment.

The oil sump chamber 32 is provided with an oil mist generation control part 300 that controls the generation of the oil mist in the oil sump chamber 32. The oil mist generation control part 300 is constituted of a wedge-like member 301 with the upper end at the apex. The wedge-like member 301 is formed by, for example, folding a metal plate. The wedge-like member 301 has a V-shaped cross-sectional shape, and extends substantially in parallel to the crank shaft 9.

The wedge-like member 301 is fixed to the crank case 4 and/or the oil case 7 by way of a bracket (not illustrated). Hence, the oil mist generation control part 300 (wedge-like member 301) is provided on the inner wall of the oil sump chamber 32 by way of the bracket (not illustrated).

In the present embodiment, the wedge-like member 301 is positioned above the oil surface within the oil sump chamber 32 and also below the first opening part 35. The apex of the wedge-like member 301 faces the lower surface 35a of the first opening part 35. Note that the first opening part 35 can be positioned within a projection plane of the wedge-like member 301 in the first partition wall 33. In other words, the first opening part 35 may be penetratingly formed in an area hidden by the wedge-like member 301 when the first partition wall 33 is observed from the bottom surface of the oil case 7.

It is preferred that the wedge-like member 301 is positioned just below the first opening part 35 and the piston 11. More specifically, the preferred structure is such that the apex of the wedge-like member 301, the central axis of the first opening part 35, and the central axis of the piston 11 extend on the same axial line.

In the present embodiment, if the pressure in the crank chamber 3 becomes positive along with the movement of the piston 11 to the bottom dead center, the high-pressure gas in the crank chamber 3 is injected through the first opening part 35 into the oil sump chamber 32. In other words, the gas in the crank chamber 3, which is injected along with the movement of the piston 11 to the bottom dead center, is pushed out of the first opening part 35 into the oil sump chamber 32. At least a part of the injected gas collides with the wedge-like member 301 in the oil sump chamber 32 and then disperses, for example, along the wedge-like member 301, whereby the injection force of the gas is suppressed. Under such control, the generation of the oil mist is decreased. To be specific, in the present embodiment, the wedge-like member 301 disperses the gas injected into the oil sump chamber 32, thereby controlling the generation of the oil mist in the oil sump chamber 32.

For example, at the time of high-speed rotation of the engine 1, the gas might be injected through the first opening part 35 into the oil sump chamber 32 in a large amount at an excessive injection force. Thus, if the wedge-like member 301 is omitted, there is a possibility that the gas efficiently collides with the oil surface and then is excessively atomized, with the result that the oil is excessively consumed. In this regard, according to the present embodiment, the wedge-like member 301 is provided, whereby a part of the gas can collide with the wedge-like member 301. The injection force of the gas can be suppressed this way. Compared to the structure not having the wedge-like member 301, the oil is less atomized and accordingly is not excessively consumed. That is, it is possible to suppress, by means of the wedge-like member 301, the excessive generation of the oil mist in the oil sump chamber 32, for example, upon the high-speed rotation of the engine 1, thereby optimizing the generation of the oil mist.

In particular, according to the present embodiment, the lubricating device 50 of the engine 1 includes: the crank chamber 3, in which the pressure varies as the piston 11 moves up and down; the oil sump chamber 32 which is disposed below the crank chamber 3 to retain lubricating oil; the first partition wall 33 that separates the crank chamber 3 and the oil sump chamber 32; the first opening part 35 that penetrates the first partition wall 33 and provides communication between the crank chamber 3 and the oil sump chamber 32; and the oil mist generation control part 300 (wedge-like member 301) that disperses the gas injected into the oil sump chamber 32 through the first opening part 35 from the crank chamber 3 when the crank chamber 3 has a positive pressure, thereby controlling the generation of the oil mist in the oil sump chamber 32. Owing to the above oil mist generation control part 300, the generation of the oil mist in the oil sump chamber 32 can be optimized.

Furthermore, according to the present embodiment, the oil mist generation control part 300 (wedge-like member 301) is provided in the oil sump chamber 32 by way of a bracket (not illustrated). With this arrangement, the gas injected through the first opening part 35 collides with the oil mist generation control part 300, making it possible to suppress the excessive generation of the oil mist in the oil sump chamber 32 and optimize the generation of the oil mist.

In the description of the present embodiment, the wedge-like member 301 is employed as an example of the oil mist generation control part 300. However, the oil mist generation control part 300 is not limited to this structure. To be specific, the oil mist generation control part 300 can have any structure as long as the gas injected through the first opening part 35 can collide with the structure and then disperse so as to suppress the injection force of the gas and control the generation of the oil mist.

The first to third embodiments specify an example where the single first opening part 35 is provided. However, plural first opening parts 35 can be provided instead. Further, the first to third embodiments specify an example where the first opening part 35 is positioned on the axis along which the piston 11 moves up and down. However, the first opening part 35 may be positioned aslant at a predetermined angle to the axis along which the piston 11 moves up and down.

Further, the engine 1 of the first to third embodiments can be installed as a power source for a portable work machine such as a brush/weed cutter, a hole-digging machine, or a concrete cutter. Moreover, the engine 1 can be installed as a power source for a backpack work machine such as a backpack blower, a sprayer (spray), a dust blower, or a backpack brush/weed cutter.

According to the lubricating device of the engine of the present invention, the oil mist generation control part of the lubricating device of the engine disperses the gas injected from the crank chamber into the oil sump chamber or restricts the flow of the oil with which the gas collides, whereby the generation of the oil mist in the oil sump chamber is controlled. By providing the oil mist generation control part, the generation of the oil mist in the oil sump chamber can be optimized according to the engine type.

The embodiments of the present invention are described above but the present invention is not limited to these embodiments. As is needless to say, various changes and modifications can be made based on the technical idea of the present invention.

What is claimed is:

1. A lubricating device for an engine, comprising:
   a crank chamber, a pressure in which varies as a piston moves up and down;
   an oil sump chamber which is disposed below the crank chamber to retain lubricating oil and is formed, in part, by an oil case disposed below the crank chamber; and
   a first partition wall which separates the crank chamber and the oil sump chamber; wherein:
   the first partition wall includes a first opening that provides communication between the crank chamber and the oil sump chamber;
   the crank chamber, the oil sump chamber and the first partition wall are configured such that gas, which is injected from the crank chamber into the oil sump chamber through the first opening when the crank chamber has a positive pressure, collides with oil in the oil sump chamber and generates oil mist in the oil sump chamber;
   the lubricating device further comprises an oil mist generation control barrier in the oil sump chamber that disperses the gas in the oil sump chamber or restricts the flow of oil in the oil sump chamber with which the gas collides, thereby controlling an amount of oil mist generated in the oil sump chamber;
   the oil case has a bottom; and
   the oil mist generation control barrier is a convex portion that stands upright on the bottom of the oil case.

2. The lubricating device for an engine according to claim 1,
   wherein the convex portion is constituted of a tubular member having an open upper surface, and the upper surface of the tubular member faces the first opening.

3. The lubricating device for an engine according to claim 2,
   wherein the tubular member is provided with an oil flow path that provides communication between an inside and an outside of the tubular member and allows oil to pass through.

4. The lubricating device for an engine according to claim 1,
   wherein the convex portion is a columnar member, and the injected gas collides with an upper surface of the columnar member.

5. The lubricating device for an engine according to claim 1,
   wherein an upper end of the convex portion is positioned above an oil surface in the oil sump chamber.

6. The lubricating device for an engine according to claim 1, further comprising:
   a valve drive chamber which is disposed on a side of the crank chamber to accommodate a drive component of each of valve mechanisms for intake and exhaust; and
   a second partition wall that separates the crank chamber and the valve drive chamber; wherein:
   the second partition wall includes a second opening that provides communication between the crank chamber and the valve drive chamber, and
   the crank chamber, the oil sump chamber, the first partition wall, the second partition wall and the valve drive chamber are configured such that (1) when the crank chamber has a negative pressure, oil mist in the oil sump chamber is supplied to the crank chamber through the first opening, and (2) when the crank chamber has a positive pressure, oil mist in the crank chamber is supplied to the valve drive chamber through the second opening.

7. The lubricating device for an engine according to claim 1, wherein the first opening is located above an oil surface in the oil sump chamber.

8. A lubricating device for an engine, comprising:
a crank chamber, a pressure in which varies as a piston moves up and down;
an oil sump chamber which is disposed below the crank chamber to retain lubricating oil; and
a first partition wall which separates the crank chamber and the oil sump chamber; wherein:
the first partition wall includes a first opening that provides communication between the crank chamber and the oil sump chamber;
the crank chamber, the oil sump chamber and the first partition wall are configured such that gas, which is injected from the crank chamber into the oil sump chamber through the first opening when the crank chamber has a positive pressure, collides with oil in the oil sump chamber and generates oil mist in the oil sump chamber;
the lubricating device further comprises an oil mist generation control barrier that disperses the gas in the oil sump chamber or restricts the flow of oil in the oil sump chamber with which the gas collides, thereby controlling an amount of oil mist generated in the oil sump chamber; and
the first opening is above an oil level in the oil sump chamber.

* * * * *